Nov. 17, 1931.  F. A. GRITT  1,832,627
MOTOR SIMULATING DEVICE
Filed Aug. 30, 1930
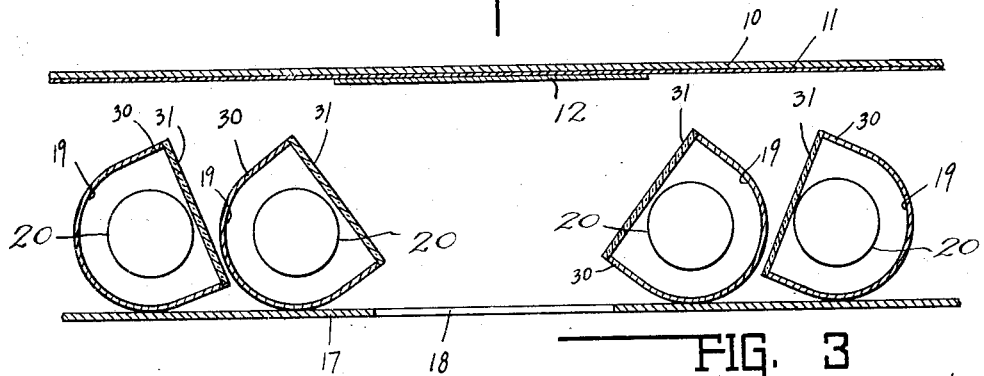
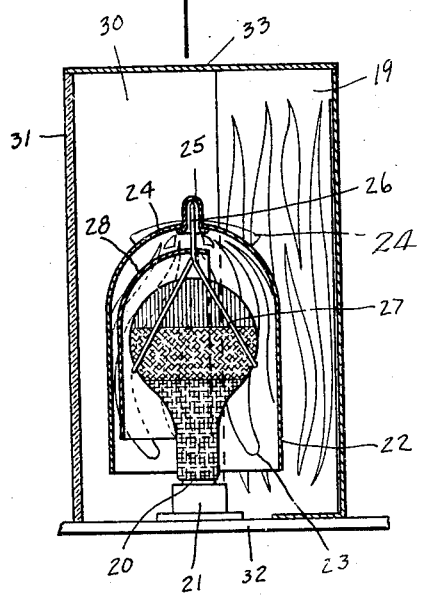
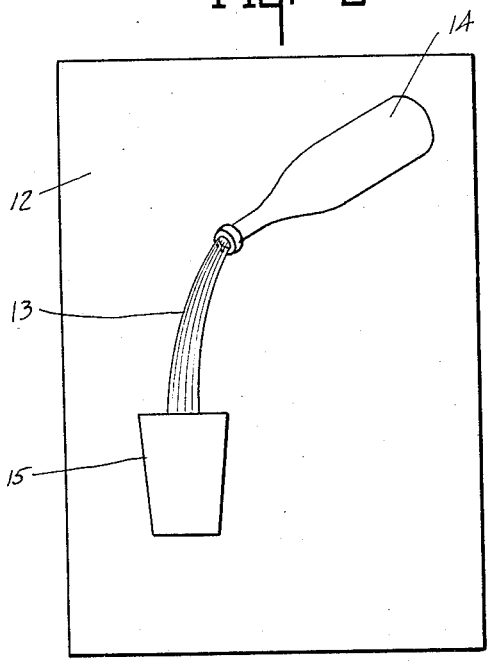
INVENTOR.
FRANK A. GRITT.
BY
ATTORNEYS.

Patented Nov. 17, 1931

1,832,627

UNITED STATES PATENT OFFICE

FRANK A. GRITT, OF INDIANAPOLIS, INDIANA, ASSIGNOR, BY MESNE ASSIGNMENTS, TO GRITT, INC., OF INDIANAPOLIS, INDIANA, A CORPORATION OF INDIANA

MOTION SIMULATING DEVICE

Application filed August 30, 1930. Serial No. 478,930.

This invention relates to the production of motion simulations and is particularly adaptable for so-called out-door use.

The chief object of this invention is to provide means whereby signs capable of out-door use and the like can be illuminated so as to simulate motion and which means are all relatively simple in character and economical to produce and operate.

The chief feature of the invention consists in the illumination of an opaque surface by normally concealed illumination, so arranged as to illuminate said surface whereby motion simulation is obtained thereon.

Another feature of the invention consists in the provision of an enclosed unit capable of out-door use for producing illumination in a form capable of simulating motion.

Other objects and features of the invention will be understood from the accompanying drawings and the following description and claims:

Figure 1 is a fragmentary horizontal section of a device embodying this invention. Fig. 2 is an enlarged central sectional view through one of the enclosed sources of illumination. Fig. 3 is a front elevation of a portion of the rear picture panel showing the pictorial representation.

In the drawings 10 indicates a support provided with a suitable opaque surface 11, which (see Fig. 3) is provided with a pictorial image 12 representative of an object normally capable of motion, such as the stream of liquid 13, which is pouring from one vessel 14 into another vessel 15. The illumination thrown upon the opaque pictorial image is obtained from a relatively concealed source of illumination.

In Fig. 1 of the drawings the opaque surface 12 is shown in section as a sheet applied to the portion 11. Positioned forwardly thereof, in the present form of the invention, is a frame 17 including an aperture 18 through which the pictorial image representation may be viewed.

Herein a plurality of light bulbs (sources of illumination) are illustrated, and the same are positioned behind frame 17 and the light therefrom falls upon the image by a reflection of the light.

Each unit of illumination preferably includes a distorting mirror 19 which receives illumination from a light bulb 20 mounted in a socket 21. Herein, if desired, the light bulb may have certain of its portions provided with different colors. For example, the top third may be red, the middle portion may be orange or amber, and the bottom and neck portion may be yellow colored. The aforesaid is effective for providing different colored light rays.

Interposed between the light source 20 and the distorting and reflecting mirror 19 is a movable screen 22 which is herein shown of cylindrical form and provided with the openings 23 therein through which the light rays pass and impinge upon the distorting mirror. The top of the cylinder has portions thereof struck out to form fan blades 24 which are actuated by the rising heated air for rotating the screen 22.

Mounted on top of the screen 22, is a socket 25 which forms a bearing for rotatably supporting the screen 22 on a pin or shaft 26 carried by a wire bracket or anchorage 27 which yieldingly engages the light bulb 20. The light bulb therefore supports the screen.

Interposed between the light source and the image is an opaque shield 28 which prevents direct rays from impinging upon the image. Herein said shield is illustrated as semi-cylindrical and is indicated by the numeral 28. It is interposed between the screen and the light source.

In order to provide for out-door use the mirror 19 is extended as at 30 and a housing is formed which may or may not include said mirror as a portion of the wall. Said housing includes the transparent face 31, the bottom 32 and the top 33. In this way each unit of illumination is fully protected against the elements and such unit is adaptable for out-door illumination and use.

The image need not be positioned behind a frame. The image may be positioned at a different elevation than the light units and the same direct the rays to the image, such units, however, should be positioned so as to be substantially concealed.

The use of the distorting mirror secures motion simulation and is particularly adapted for the simulation of the movement of gases and liquids.

The invention claimed is:—

1. The combination of an opaque surface to be illuminated, said opaque surface bearing a pictorial representation of an object in motion, a distorting mirror for reflecting light upon said pictorial representation, a light source, and a movable screen interposed between the light source and the mirror for continuously varying the light transmitted to said mirror.

2. The combination of a substantially flat opaque surface bearing a pictorial representation of an object in motion, a distorting mirror for reflecting fluctuating light upon said pictorial representation to produce illusory motion effects upon said surface, a light source, a movable screen interposed between the source and the mirror for continuously varying the light reflected by said mirror to said pictorial representation, and a shield interposed between said light source and said surface for preventing all but reflected rays from falling upon said surface.

In witness whereof, I have hereunto affixed my signature.

FRANK A. GRITT.